SINGLE-SIDEBAND RECEIVER FOR SPEECH SIGNALS

Filed Oct. 24, 1955

INVENTOR
FRANK DE JAGER
JOHANNES ANTON GREEFKES
BY Fred M. Vogel
AGENT

United States Patent Office 2,828,412

Patented Mar. 25, 1958

2,828,412

SINGLE-SIDEBAND RECEIVER FOR SPEECH SIGNALS

Frank de Jager and Johannes Anton Greefkes, Eindhoven, Netherlands, assignors, by mesne assignments, to North American Philips Company, Inc., New York, N. Y., a corporation of Delaware Application October 24, 1955, Serial No. 542,422

Claims priority, application Netherlands October 25, 1954

6 Claims. (Cl. 250—20)

The invention relates to a single-sideband receiver for speech signals, comprising, as usual, a single-sideband demodulator.

It is known that speech signals received by means of a single-sideband receiver are still intelligible at low signal to noise ratios of about 15 db, but that at still lower signal to noise ratios of for example 12 to 9 db or still lower the intelligibility of the transmitted speech signals is insufficient for practical use.

In accordance with the invention this disadvantage may be mitigated by supplying the incoming single-sideband signals to the single-sideband demodulator via a limiter, the output signal of which is a single-sideband signal of substantially constant amplitude.

By using the invention the masking effect of noise, which is otherwise annoying at low signal to noise ratios, is considerably reduced.

Owing to the limitation the dynamic range of the signal is, of course, strongly restricted.

According to a further aspect of the invention this restriction of the dynamic range may be obviated wholly or partly by supplying the incoming single-sideband signal not only to the limiter, but also to an amplitude detector, which is followed by a low-pass filter to obtain a signal envelope, which contains at a maximum the lowest of the transmitted speech frequencies and which governs a modulator connected between the limiter and the single-sideband demodulator.

With single-receivers of the last-mentioned kind it was found that the signal to noise ratio of the signal envelope exerted a great influence on the signal to noise ratio at the receiver output. In order to obtain a signal envelope with the optimum signal to noise ratio at the receiver output, when the signal to noise ratios are low, the single-sideband signal should be supplied to the envelope detector via a filter which passes only part of the frequency band of the single-sideband speeech signal. This filter, called a partial sideband filter, is preferably chosen to be such that only speech-frequency components occurring frequently with a comparatively large amplitude, for example from 500 to 800 c./s., are passed.

The invention will be described more fully with reference to the figures.

Figure 1:
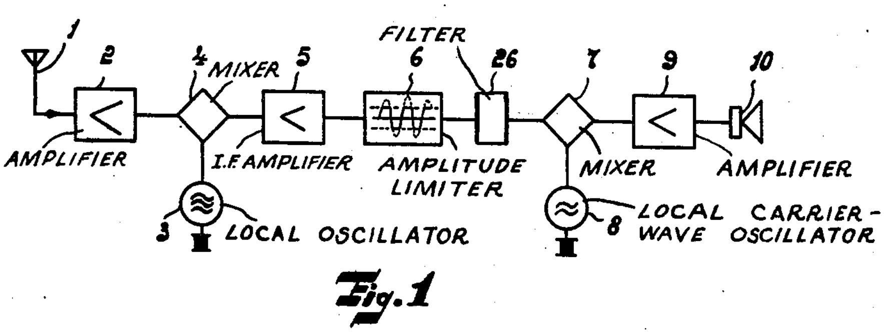
Fig. 1 is a block diagram of a single-sideband receiver according to the invention in a very simple embodiment.

With the single-sideband receiver shown in Fig. 1 the suppressed-carrier single-sideband signals received by an aerial 1 are supplied through a selective high-frequency preamplifier 2 to a mixing stage 4, which is connected to a crystal-controlled local oscillator 3. The intermediate-frequency signals produced in the mixing stage 4 are supplied to an intermediate-frequency amplifier 5, which selects the desired single-sideband signals.

In accordance with the invention the intermediate-frequency single-sideband signal is supplied to a limiter 6, which produces a limitation such that the output signal is a single-sideband signal of substantially constant amplitude. This single-sideband signal thus drastically limited, is demodulated, if necessary subsequent to filtering by means of a low-pass filter or a simple single-sideband filter, in the conventional manner by supplying it to a mixing stage 7, which may be constructed as a ring modulator, to which is also supplied an oscillator signal corresponding at least substantially in frequency to the suppressed carrier wave, and produced by a crystal-controlled oscillator 8, the signal being supplied through a low-frequency amplifier 9, which may be provided, as usual, with a filter passing only the speech-frequency band of for example 0.3 to 3.4 kc./s., to a loudspeaker 10.

The limiter 6 for the single-sideband signal supplied thereto passes primarily the component with the largest amplitude. This brings about on the one hand a material reduction of the interference and on the other hand an improved discrimination from signals in adjacent communication channels during the conversation. Noise and interference signals are suppressed during the speech intervals, if, as is known per se for automatic frequency correction, the single-sideband signal is accompanied by a pilot signal the frequency of which is adjacent to the speech-frequency band and if the single-sideband filter preceding the limiter 6 passes this pilot signal. A suitable choice at the transmitter side of the level of the pilot signal with respect to the level of limitation contributes to the maintenance of the dynamic range of the speech signals at the reception of weak signals, which improves the intelligibility.

Owing to the drastic limiting action used in the receiver shown in Fig. 1, which limiting action may be produced by limiters of the kind generally used in frequency-modulation receivers, the dynamic range of the signal is normally strongly restricted.

Figure 2:
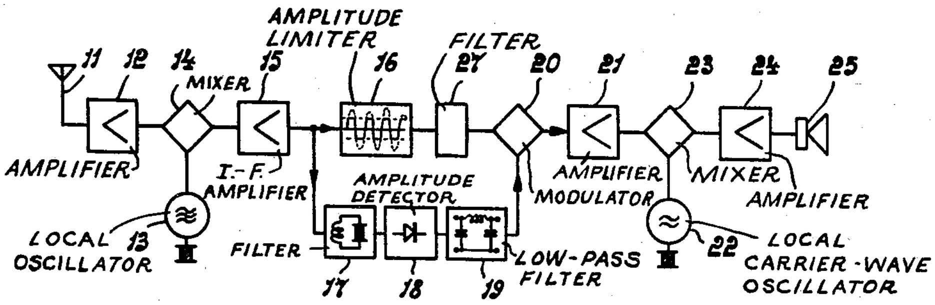
Fig. 2 shows an improved embodiment, comprising an envelope detector.

Fig. 2 shows one embodiment of a single-sideband receiver for speech signals, in which this restriction of the dynamic range may be obviated at least partly.

In the receiver shown in Fig. 2 the single-sideband signals received by an aerial 11 are supplied, as in Fig. 1, through a selective high-frequency pre-amplifier 12 to a mixing stage 14, connected to a crystal-controlled local oscillator 13. The intermediate-frequency single-sideband signal obtained is supplied, as in Fig. 1, through a selective intermediate-frequency amplifier 15 to a limiter 16. Moreover, the single-sideband signal obtained from the intermediate-frequency amplifier 15 is supplied through a partial sideband filter, constructed for example as a crystal filter 17, to an amplitude detector 18, followed by a low-pass filter 19. The partial sideband filter 17 is preferably constructed in a manner such that only frequencies of the single-sideband signal corresponding to speech-frequency components of 500 to 800 c./s. are passed without being attenuated. The low-pass filter passes not only direct voltages but also alternating voltages to a maximum of the lowest of the transmitted speech frequencies substantially without attenuation. If the lowest transmitted speech-frequencies, as usual, are for example 300 c./s., the cut-off frequency of the low-pass filter 19 may be 300 c./s. or less. The signal envelope thus occurring at the output of the low-pass filter 19 is utilized for amplitude demodulation of the limited single-sideband signal obtained from the limiter 16. To this end the signal envelope controls a push-pull modulator 20, which is preferably constructed as a ring modulator, to which the limited single-sideband signal is supplied as a carrier wave of variable frequency. The single-sideband signal obtained from the modulator 20 is identical with the incoming, normal single-sideband signal, if the modulation percentage is suitably chosen, but the signal to noise ratio is improved.

As stated above with reference to Fig. 1, the limiter 16 produces a material reduction of the interference, so that for the limited single-sideband signal the signal to noise ratio is more favourable than that of the incoming signal. For the signal envelope obtained from the amplitude detector 18, the signal to noise ratio is also more favourable than that of the incoming single-sideband signal, particularly owing to the preceding partial sideband filter.

The single-sideband signal obtained from the modulator 20 may be demodulated in a conventional manner. To this end it is supplied, preferably via a separation amplifier 21, suppressing harmonics of the single-sideband signal, to a mixer or ring modulator 23, which is connected to a crystal-controlled carrier-wave oscillator 22. The low-frequency signal obtained is supplied through an amplifier 24 with a filter passing only the speech-frequency band to the reproducing device 25.

With the receiver shown in Fig. 2 the signal to noise ratio of the output signal varies to a great extent with the signal to noise ratio of the signal envelope obtained from the amplitude detector 18 and the low-pass filter 19. By reducing the pass-band of the low-pass filter 19 the signal to noise ratio of the signal envelope may be improved, but then the quality of the reproduced signals is less satisfactory. It was a surprise to find that even with a cut-off frequency of the low-pass filter 19 of for example 50 c./s. a satisfactory intelligibility of the speech signal is obtained.

If a single-sideband speech signal is received in a receiver of the type shown in Fig. 2, this signal being accompanied by a pilot signal, the amplitude of which varies inversely proportionally with the voltage or the power of the speech signal, the amplitude value required for the expansion of the dynamic range may be obtained by amplitude detection of the pilot signal. To this end the sharply selective filter 17 is tuned to the frequency of the pilot signal.

With the receivers shown in Figs. 1 and 2 a further improvement of nearly 3 db of the signal to noise ratio of the output signal was obtained, when between the limiter 6 or 16 and the following modulator 7 or 20 respectively there was connected a simple single-sideband filter as indicated in the figures and designated by 26 and 27 respectively.

It should be particularly noticed that the invention can be applied substantially only to the transmission of speech signals. Only with speech signals the use of a limiter and of an envelope detector appeared to be possible without detracting excessively from the quality of the low-frequency signal.

It should finally be noted that the output voltage of the envelope detector 18 comprises a direct-current component, which must not be suppressed, but must be supplied to the push-pull modulator 20.

What is claimed is:

1. A receiver for receiving suppressed-carrier single-sideband signals, comprising a single-sideband demodulator including a mixer and a local carrier-wave oscillator, an amplitude limiter, and means connected to apply said single-sideband signals to the mixer of said demodulator through said amplitude limiter.

2. A receiver as claimed in claim 1, including a single-sideband filter connected between said amplitude limiter and said demodulator.

3. A receiver for receiving suppressed-carrier single-sideband signals, comprising a single-sideband demodulator including a mixer and a local carrier-wave oscillator, a modulator having an output circuit connected to the mixer of said demodulator and having two input circuits, an amplitude limiter, means connected to apply said single-sideband signals to an input circuit of said modulator through said amplitude limiter, an amplitude detector connected to receive said single-sideband signals, a low-pass filter connected to the output of said amplitude detector thereby to obtain an envelope signal from said single-sideband signals, and means connected to apply said envelope signal to the other input circuit of said modulator.

4. A receiver as claimed in claim 3, including a partial sideband filter connected to the input of said amplitude detector so that said single-sideband signals pass therethrough before reaching said amplitude detector, said partial sideband filter having the characteristic of passing only a portion of the frequency of said single-sideband signals.

5. A receiver as claimed in claim 3, in which said single-sideband signals are accompanied by a pilot signal, and including a filter connected to the input of said amplitude detector and having the characteristic of passing only said pilot signal, so that only said pilot signal is applied to said amplitude detector.

6. A receiver as claimed in claim 3, including a single-sideband filter connected between said amplitude limiter and said modulator.

References Cited in the file of this patent

UNITED STATES PATENTS 2,611,083 Arends ---------------- Sept. 16, 1952